(12) United States Patent
Jamerson

(10) Patent No.: US 8,332,836 B2
(45) Date of Patent: Dec. 11, 2012

(54) SYSTEM AND METHOD FOR UPDATING PORTABLE ELECTRONIC DEVICES USING A RECHARGEABLE BATTERY

(75) Inventor: Eric Matthew Jamerson, Prospect, VA (US)

(73) Assignee: Pine Valley Investments, Inc., Las Vegas, NV (US)

( * ) Notice: Subject to any disclaimer, the term of this patent is extended or adjusted under 35 U.S.C. 154(b) by 796 days.

(21) Appl. No.: 12/402,132

(22) Filed: Mar. 11, 2009

(65) Prior Publication Data

US 2010/0235822 A1 Sep. 16, 2010

(51) Int. Cl.
*G06F 9/445* (2006.01)
(52) U.S. Cl. ......... 717/172; 717/173; 717/177; 717/178
(58) Field of Classification Search .................. None
See application file for complete search history.

(56) References Cited

U.S. PATENT DOCUMENTS

| 5,689,825 | A | 11/1997 | Averbuch et al. |
| 6,194,866 | B1 | 2/2001 | Olsson |
| 2005/0251798 | A1* | 11/2005 | Fraley ............................ 717/168 |
| 2005/0262498 | A1* | 11/2005 | Ferguson et al. ............. 717/172 |
| 2007/0123303 | A1 | 5/2007 | Book et al. |
| 2007/0252554 | A1* | 11/2007 | Feng et al. ..................... 320/116 |
| 2008/0092132 | A1 | 4/2008 | Stuber et al. |

\* cited by examiner

*Primary Examiner* — Chuck Kendall
(74) *Attorney, Agent, or Firm* — Fox Rothschild, LLP; Robert J. Sacco

(57) ABSTRACT

A system and method for updating portable electronic devices using a rechargeable battery are provided. The method includes accessing update data stored in a battery removably connected to a portable electronic device and transferring the stored update data from the battery to the portable electronic device. The method further includes updating the portable electronic device with the transferred update data.

20 Claims, 4 Drawing Sheets

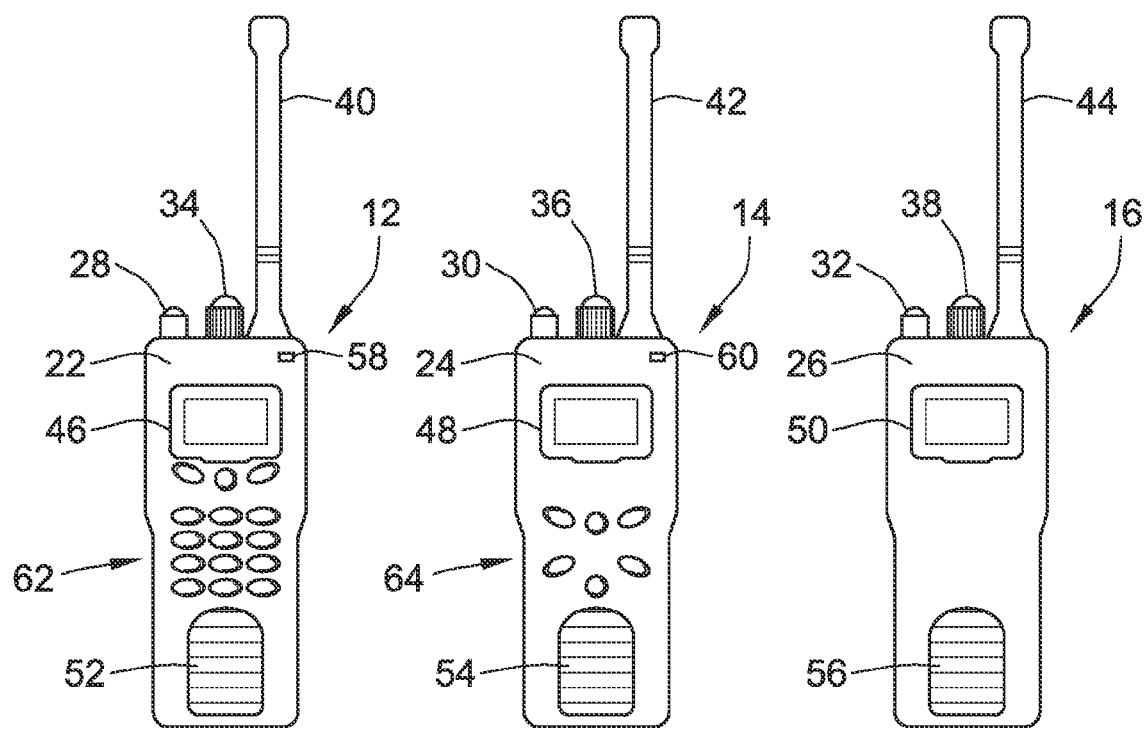
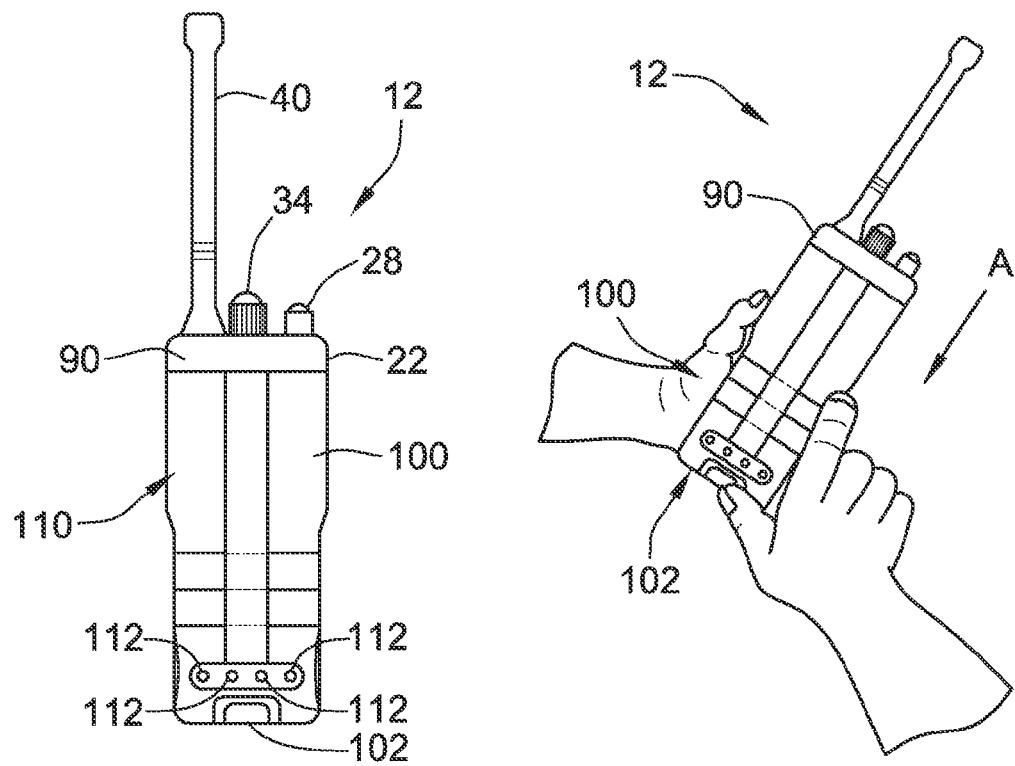

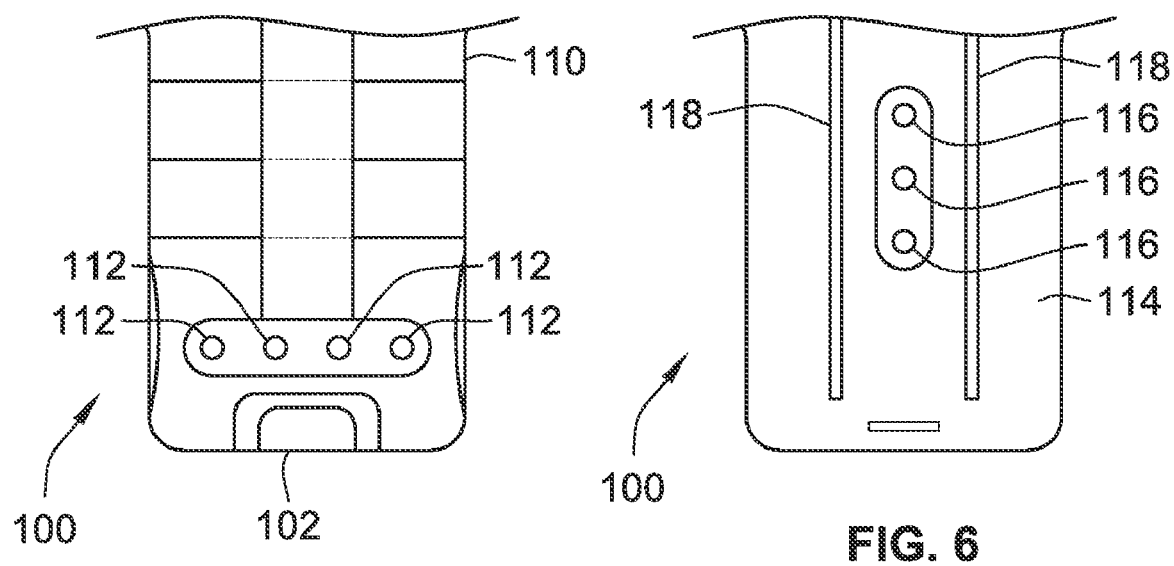
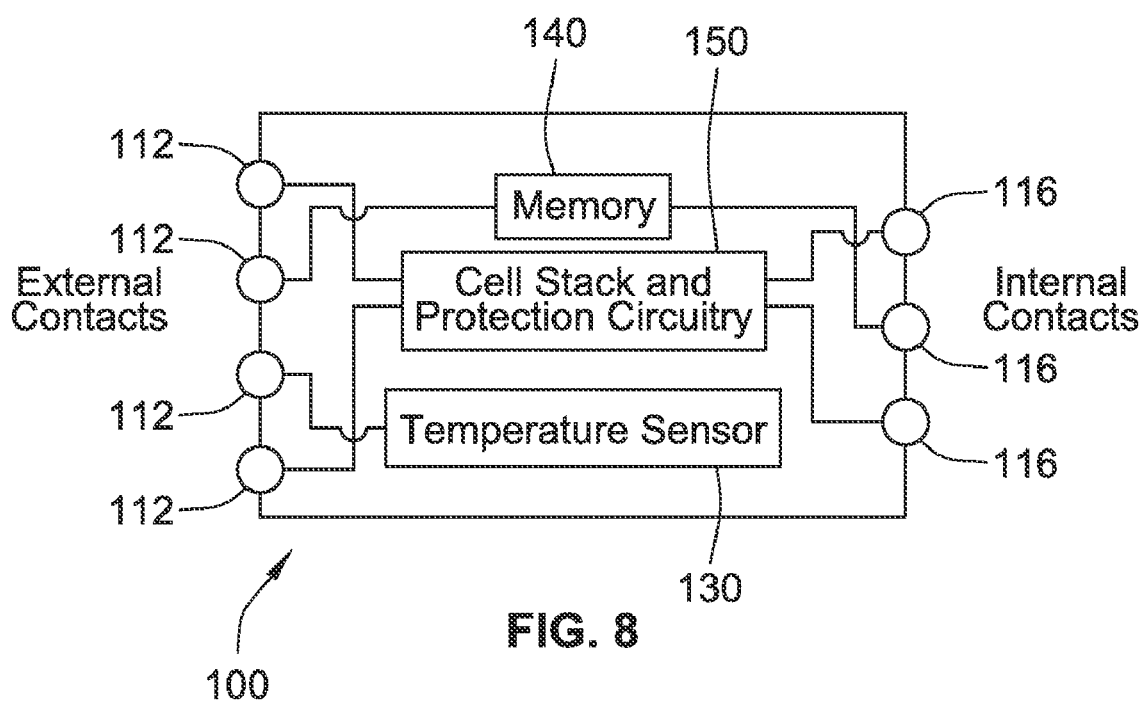

1

SYSTEM AND METHOD FOR UPDATING PORTABLE ELECTRONIC DEVICES USING A RECHARGEABLE BATTERY

BACKGROUND OF THE INVENTION

This invention relates generally to portable electronic devices, and more particularly, to updating these portable electronic devices using a rechargeable battery.

Portable electronic devices, such as portable communication devices, including land mobile radios, typically include some type of firmware that internally controls various operations of the portable communication devices. The firmware is usually one or more programs to enable the basic operation of the devices, as well as provide higher level functions of the devices. The firmware normally resides in memory within the portable communication devices, for example, in a Read-Only-Memory (ROM) or a flash memory that allows erasing and/or reprogramming.

Updating the firmware in a fleet of portable communication devices, such as a pool of land mobile radios used by a group (e.g., fire department), typically requires removing each of the portable communication devices from service and updating the devices individually. This process of updating the portable communication devices results in significant overall down time and inconvenience for users. The users may also have to wait for the updating process or use a loaner device. Thus, the updating process is time consuming and can be costly to operations.

Known methods that attempt to reduce the down time of the updating process include updating the firmware over the air, for example, using radio-frequency (RF) bandwidth. However, using the RF bandwidth can congest the RF network for normal communications, thereby affecting the overall performance of the communication system. Additionally, the over air updating process can be a very slow process because of the data transfer rates when using the RF bandwidth or having other communications take priority over the updating.

BRIEF DESCRIPTION OF THE INVENTION

In accordance with one embodiment, a method of providing update data to a portable electronic device is provided. The method includes accessing update data stored in a battery removably connected to a portable electronic device and transferring the stored update data from the battery to the portable electronic device. The method further includes updating the portable electronic device with the transferred update data.

In accordance with another embodiment, a method for updating firmware in portable communication devices is provided. The method includes adding to a pool of rechargeable batteries a rechargeable battery having a firmware update stored within a memory of the rechargeable battery. The method further includes configuring the rechargeable battery to transfer the firmware update to a portable communication device upon connection of the rechargeable battery to the portable communication device.

In accordance with yet another embodiment, a rechargeable battery is provided. The rechargeable battery includes a memory storing update data and a data contact configured to engage a portable electronic device and allow access by the portable electronic device to the update data stored in the memory.

BRIEF DESCRIPTION OF THE DRAWINGS

FIG. 1 is a front plan view of portable device that may be powered and updated by a rechargeable battery constructed in accordance with various embodiments of the invention.

FIG. 2 is a front plan view of another portable device that may be powered and updated by a rechargeable battery constructed in accordance with various embodiments of the invention.

FIG. 3 is a front plan view of another portable device that may be powered and updated by a rechargeable battery constructed in accordance with various embodiments of the invention.

FIG. 4 is a diagram illustrating the removable connection of a rechargeable battery to a portable device.

FIG. 5 is a back plan view of a rechargeable battery constructed in accordance with various embodiments of the invention.

FIG. 6 is a front plan view of a rechargeable battery constructed in accordance with various embodiments of the invention.

FIG. 7 is a back plan view of a portable device having a rechargeable battery constructed in accordance with various embodiments of the invention connected thereto.

FIG. 8 is a schematic block diagram of a rechargeable battery constructed in accordance with various embodiments of the invention.

DETAILED DESCRIPTION OF THE INVENTION

Figure 9:
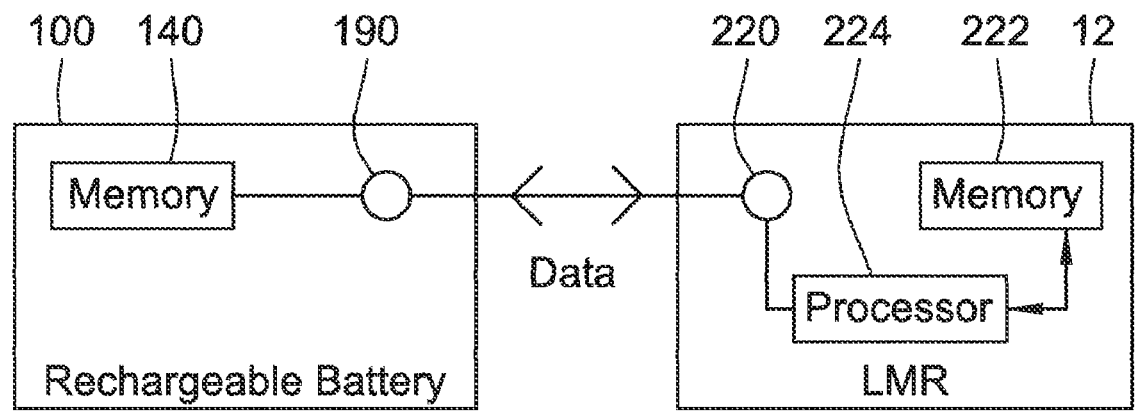
FIG. 9 is a block diagram of a rechargeable battery connected to a land mobile radio to transfer data therebetween in accordance with various embodiments of the invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

For simplicity and ease of explanation, the invention will be described herein in connection with various embodiments thereof. Those skilled in the art will recognize, however, that the features and advantages of the various embodiments may be implemented in a variety of configurations. It is to be understood, therefore, that the embodiments described herein are presented by way of illustration, not of limitation.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments of the invention provide for updating portable electronic devices, particularly updating the firmware of portable communication devices using the battery for these devices. In the various embodiments, the batteries are rechargeable batteries having information stored therein to transfer to the portable electronic devices to update, for example, the firmware of the devices. The information is stored within internal memory of the batteries, such as in an integral memory within a battery pack. Accordingly, the update information is disseminated through the batteries resulting in an updating process that is transparent to users and does not require time consuming down time to manually update the portable electronic devices or the use of over the air bandwidth for the updating process.

It should be noted that although the various embodiments are described herein in connection with land mobile radios (LMRs), the various embodiments may used in connection with any electronic devices using a battery (e.g., a rechargeable battery) for at least some of the power requirements of the devices, such as, cellular telephones, portable computers, etc. Moreover, the updating provided by the various embodiments is not limited to the updating of firmware, but may include the transfer of any data to the portable electronic device from a battery. For example, new applications may be uploaded to the portable electronic device via batteries in accordance with various embodiments. Additionally, it should be noted that although the various embodiments may be described in connection with a particular kind or type of battery or a battery having a particular configuration, the various embodiments are not so limited and may be implemented in connection with any kind or type or battery. For example, even through the various embodiments may be described in connection with rechargeable batteries having particular memory elements, batteries with different types of memory elements may be provided.

Various embodiments of the invention may be implemented in connection with different types of portable electronic devices, for example, as part of a rechargeable battery that powers, for example, a land mobile radio (LMR) 12, 14 or 16 as shown in FIGS. 1, 2 and 3. The LMRs 12, 14 and 16 are powered by a detachable rechargeable battery (on the back side of the LMRs 12, 14 and 16 and not shown in FIG. 1) constructed in accordance with various embodiments of the invention as described below. However, the various embodiments may be implemented in connection with rechargeable batteries used in connection with other electronic devices and units, and are not limited to LMRs.

The LMRs 12, 14 and 16 are configured as portable units having a housing 22, 24 and 26, respectively, configured for handheld operation. The LMRs 12, 14 and 16 each include a power/volume knob 28, 30 and 32, respectively, on a top portion of the LMRs 12, 14 and 16 to turn power on and off and to control volume. A system or channel knob 34, 36 and 38, respectively, on the top portion of the LMRs 12, 14 and 16 is provided to, for example, change channels or talk groups within a particular network and may have a predetermined number of rotary positions. Other buttons and knobs may be provided as are known on the top of other portions (e.g., sides) of the LMRs 12, 14 and 16, but are not shown or described for simplicity. An antenna 40, 42 and 44, respectively, also extends from the top portion of the LMRs 12, 14 and 16 to facilitate bi-directional communication.

A front portion of the LMRs 12, 14 and 16 generally includes a display 46, 48 and 50, respectively, and a speaker 52, 54 and 56, respectively. The LMRs 12 and 14 also include a microphone 58 and 60, respectively, as well as a plurality of user depressible buttons 62 and 64, respectively, that may be used, for example, for entering numeric inputs and selecting various functions of the LMRs 12 and 14. The user depressible buttons 62 and 64 may be configured as part of a user interface and include a numeric or alphanumeric keypad that provide control or activation of a particular function of the LMRs 12 and 14.

The displays 46, 48 and 50 may be configured having a plurality of lines, for example, for displaying a system designation on one line, a group designation on another line and icons or other information (e.g., mode of operation) on additional lines. Other information may be provided on the displays 46, 48 and 50, for example, a current firmware version update message or a battery power level indicator.

Reference will now be made to LMR 12. However, the following description applies to any of the LMRs described herein. The LMR 12 as shown in FIG. 4 includes a back portion 90 configured to connect to a rechargeable battery 100, which may be configured as a battery pack having a plurality of batteries therein. A latch 102 may be provided at the bottom of the rechargeable battery 100 or on the back portion 90 that allows for removable connection (e.g., attachment and detachment) of the rechargeable battery 100 to the back portion 90. For example, as shown in FIG. 4, to remove the rechargeable battery 100, the latch 102 is depressed and the rechargeable battery 100 lifted or slid along the pack portion 90 as indicated by the arrow A until detached or disengaged with the pack portion 90. Accordingly, the rechargeable battery 100 is removably connected to a portable electronic device, which in this embodiment is the LMR 12.

A back surface 110 of the rechargeable battery 100 as shown in FIG. 5 is exposed and forms part of the back of the LMR 12 when connected thereto. The rechargeable battery 100 may be a battery pack that is packaged in a plastic case. The rechargeable battery 100 includes contacts 112 (which may be referred to as external or exposed contacts) on the back surface 110 and that are configured for connection to terminals of, for example, a battery charger (not shown) as is known. The contacts 112 are exposed when the rechargeable battery 100 is connected to the LMR 12 (as shown in FIGS. 4 and 7) or when detached therefrom. A front surface 114 of the rechargeable battery 100 as shown in FIG. 6 also includes contacts 116 (which may be referred to as internal contacts) that are configured to connect to corresponding contacts (not shown) on the back portion 90 of the LMR 12. It should be noted that the front surface 114 may include members, for example, slots 118 or other guides to align the rechargeable battery 100 on the back portion 90 of the LMR 12. Thus, the contacts 112 are external connections that allow for connecting the rechargeable battery 100 to, for example, a charger and the contacts 116 are internal connections for connecting the rechargeable battery 100 to the LMR 12. It should be noted that the rechargeable battery may be removed from the LMR 12 and separately connected to a charger for charging. Accordingly, while one or more rechargeable batteries 100 are being charged, another rechargeable battery 100 that is already charged (e.g., fully charged) may be connected to the LMR 12, which allows uploading of data within a memory of the rechargeable battery 100 to the LMR 12 as described in more detail herein.

The rechargeable battery 100 constructed in accordance with various embodiments of the invention provides for uploading data directly from a memory 140 of the rechargeable battery 100 to an electronic device to which the rechargeable battery 100 is connected, such as the LMRs 12, 14 or 16.

The rechargeable battery 100 also may include other components, such as components for protecting the rechargeable battery 100. For example, as shown in FIG. 8, the rechargeable battery 100 includes a temperature sensor 130 that is connected to one of the contacts 112, which may be configured as a charge thermistor contact. The cell stack and protection circuitry portion 150 is connected to one or more contacts 116, which may be configured as a charge positive contact and charge ground contact. The memory 140 is connected to one of each of the contacts 112 and 116. The contact 116 may be configured as a radio data contact to allow data stored within the memory 140 to be transferred to the LMR 12, 14 or 16 (or from the LMR 12, 14 or 16 to the memory 140) through the radio data contact when the rechargeable battery 100 is connected to the LMR 12, 14 or 16.

Referring now to the memory storage capabilities of the rechargeable battery, the memory 140, which in various embodiments is a memory module, allows update data to be uploaded to the memory 140, for example, from a controller of a charging station. The memory 140 in various embodiments is an integrally formed memory, for example, within a housing of the rechargeable battery 100. The memory 140 may be any type of memory component, for example, an Erasable Programmable Read-Only Memory (EPROM), a Random Access Memory (RAM), a Read Only Memory (ROM), etc. In general, the memory 140 is any type of memory component capable of storing data for uploading to the LMRs 12, 14 and 16, for example, firmware, updates, bug fixes, etc. and receiving and storing data from the LMRs 12, 14 and 16. It should be noted that the memory 140 may be capable of being updated (e.g., EPROM) or may be fixed such that the memory 140 cannot be altered (e.g., ROM). It also should be noted that more than one memory element may be provided and the multiple memory elements may be of the same type or may be of different types. The memory 140 in some embodiments is at least one gigabyte. However, the memory 140 may be larger or smaller as desired or needed, for example, based on the size of a firmware update.

At least some components of the rechargeable battery 100 are protected by the cell stack and protection circuitry 150. The cell stack and protection circuitry 150 may include battery cells (not shown) that are charged and provide power as is known. For example, the cell stack may include a series of nickel-cadmium (NiCad or NiCd) or nickel metal hydride (NiMH) cells (e.g., six cells in series or a parallel combination thereof). The protection circuitry is provided in any known manner to, for example, prevent overloading of the cells and may include one or more resettable circuit breakers.

Accordingly, the memory 140 may have stored therein different types of data to be uploaded to the LMR 12, 14 or 16, as well as other information relating to the rechargeable battery 100. For example, the memory 140 may include a firmware update to be uploaded to the LMR 12, 14 or 16. The information also may include, for example, characteristics of the rechargeable battery 100 that may be accessed, as is known, by a battery charger and used to determine the charging and discharging characteristics of the rechargeable battery 100. Additionally, data may be transferred to the memory 140 from the LMR 12, 14 or 16.

Thus, as shown in FIG. 9, when the rechargeable battery 100 is connected to the LMR 12 (e.g., removably connected), one of the internal contacts (e.g., one of the contacts 116) of the rechargeable battery 100, which may be configured as a radio data contact 190 makes electrical connection with a corresponding contact on the back portion 90 of the LMR 12 (both shown in FIG. 7), which in this embodiment is a battery data contact 220. With the radio data contact 190 electrically connected to the battery radio contact 220, electrical signals, including data stored within the memory 140 of the rechargeable battery 100 may be transferred to a memory 222 within the LMR 12 using or via a processor 224. It should be noted that the LMR 12 may include a plurality of memory components of the same or different type. The memory 222 may include permanent data, for example, firmware for operating the LMR 12 and may also include temporary data, for example, channel information, status information, etc. It also should be noted that data may likewise be transferred from the memory 222 of the LMR 12 to the memory 140 of the rechargeable battery 100 if the memory 140 is capable of having data transferred thereto.

In operation, for example, if the firmware stored in the memory 140 of the rechargeable battery 100 is newer than the firmware stored in the memory 222 of the LMR 12, then the firmware is transferred from the memory 140 of the rechargeable battery 100 to the memory 222 of the LMR 12 and overwrites the firmware (or a portion thereon if a firmware update or patch is provided). Alternatively, is the firmware in the memory 222 of the LMR 12 is newer than the firmware in the memory 140 of the rechargeable battery 100 then the firmware is transferred from the memory 222 of the LMR 12 to the memory 140 of the rechargeable battery 100. The processor 224 of the LMR 12 may control the comparison and transfer of data between the LMR 12 and the rechargeable battery 100.

Figure 10:
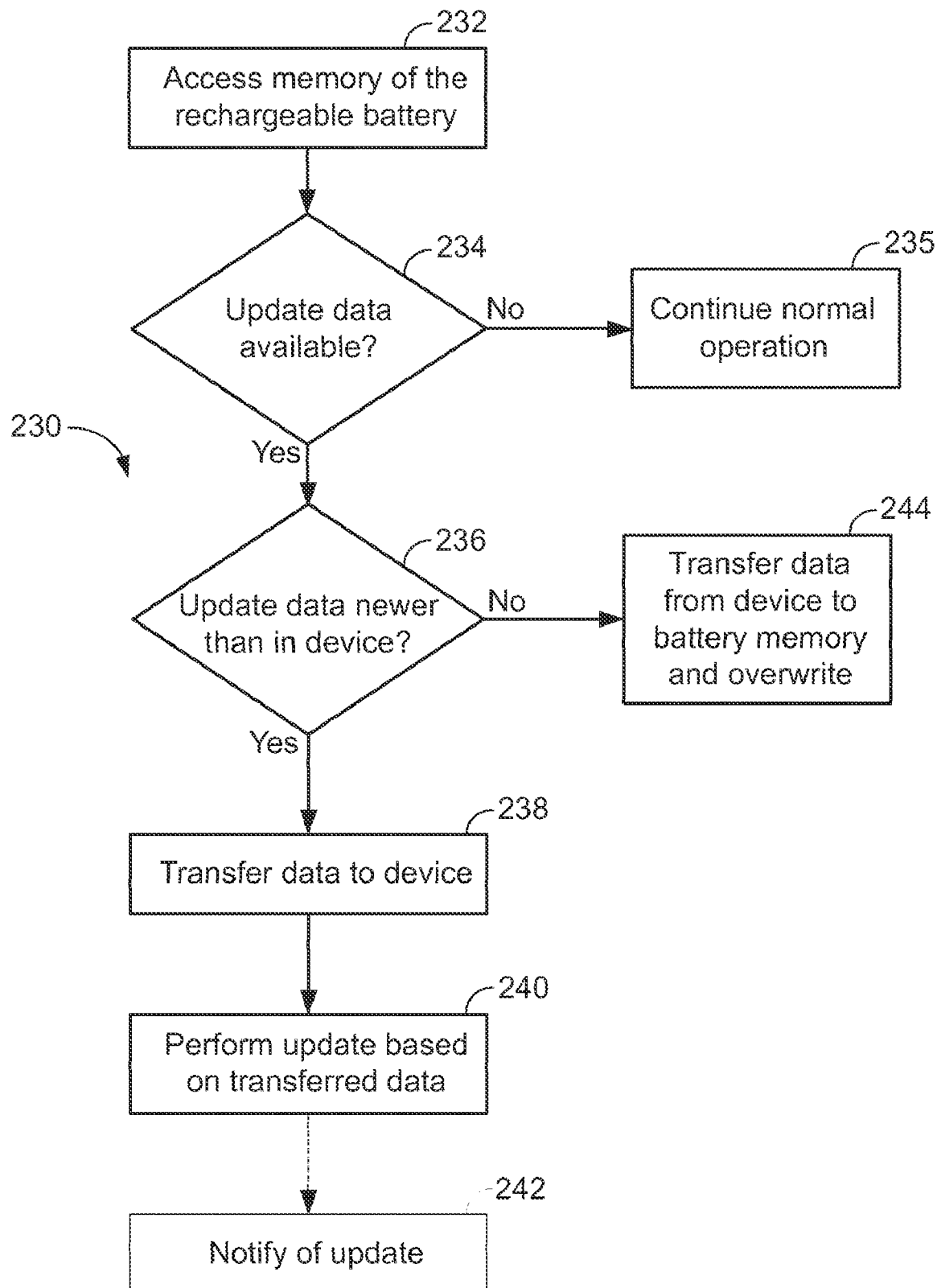
FIG. 10 is a flow chart illustrating a method for transferring data between a battery and an electronic device in accordance with various embodiments of the invention.

The transfer of data is performed and controlled by the electronic device (e.g., the LMR 12) in accordance with a method 230 as shown in FIG. 10. The data is transferred directly from the battery to the electronic device or vice versa. It should be noted that although the method 230 is described in connection with a removable connectable rechargeable battery that can be connected to and removed from an LMR, the method 230 may be implemented in connection with any electronic device having a removably connectable battery. When a battery, and in particular, a rechargeable battery is connected to the LMR (e.g., engaging the rechargeable battery with the LMR), the memory of the battery is accessed at 232. For example, a processor within the LMR accesses the memory of the battery through a radio data contact of the battery that is electrically connected to a battery data contact of the LMR. The access of the memory may be performed in any known manner for a processor accessing data stored in a memory element.

After the memory of the battery is accessed, a determination is made at 234 whether update data is available in the memory of the battery. For example, a determination is made whether a firmware update, software patch, application update, configuration update, etc. is stored within the memory of the battery. The update data may be stored in one or more memory locations within the memory of the battery. The processor of the LMR may be preprogrammed to access a particular memory location or portion of the memory of the battery to determine whether an update is available. Optionally, the processor may scan the entire memory of the battery.

If a determination is made at 234 that no update data is available, then at 235 normal operation of the LMR continues. For example, the normal communication operations of the LMR continue. If a determination is made at 234 that an update is available, then at 236 a determination is made as whether the update data in the memory of the battery is newer than the data in the LMR. For example, the processor may perform a firmware version comparison to determine whether the firmware version update in the memory of the battery is newer than the firmware version currently operating in the LMR. If a determination is made at 236 that the update data in the memory of the battery is newer than the data in the LMR, the update data from the battery is transferred to the device, such as to a memory of the device at 238. For example, a firmware update may be written to a memory of the LMR. The firmware update may overwrite the existing firmware or add to the existing firmware.

Once the update data has been transferred to the LMR, for example, written to the memory of the LMR, an update is performed at 240 based on the transferred data. For example, an update procedure in the firmware update may be performed to update the firmware within the LMR. The update may, for example, provide additional or improved functionality to the operation of the LMR. Thereafter, notification of the update optionally may be provided at 242. For example, the LMR may provide notification when the update is being performed and when the update is complete, which may indicate the version number for the updated firmware. Accordingly, as shown in FIG. 12 a message 250 may be displayed on the display 46 of the LMR 12 (shown in FIG. 1) indicating that a firmware update has been performed and displaying the new version of the firmware.

Figure 11:
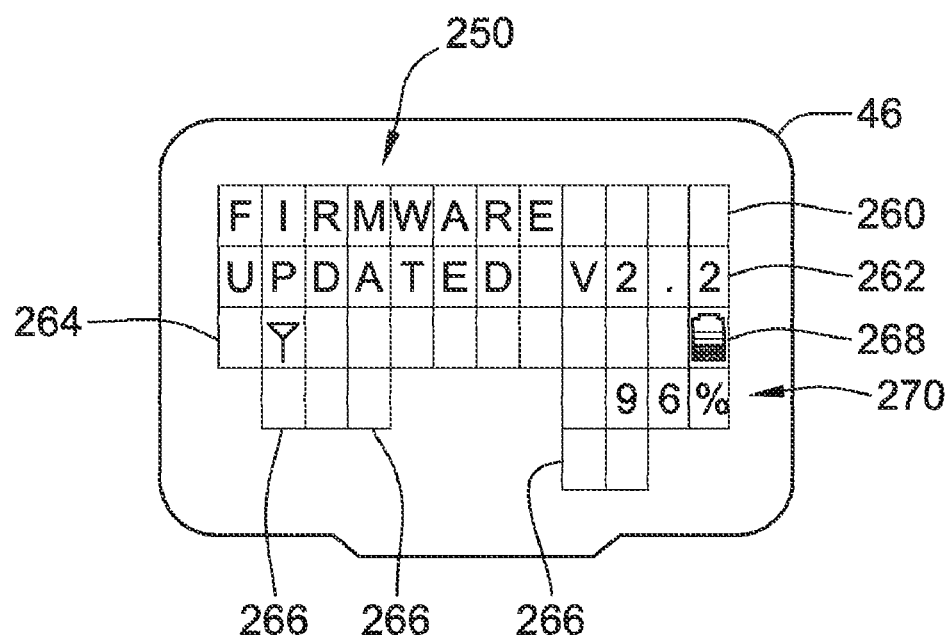
FIG. 11 is a diagram of an exemplary display of a portable device having a rechargeable battery constructed in accordance with various embodiments of the invention connected thereto.

Other types of information also may be displayed as shown in FIG. 11. For example, different lines 260, 262 and 264 of the display 250 may display other information instead of or in addition to the message 250. For example, lines 264 or display elements 266 may display other information such as a battery level indicated by a battery level icon 268 or a maximum battery capacity 270. Each line 260 or 262 may be formed from a plurality of display elements 266.

Referring again to the method 230, it should be noted that the update at 240 may be performed automatically and immediately after the update data is transferred or uploaded to the LMR, for example, by overwriting the data in the memory of the LMR as part of the start up of the LMR when the LMR is turned on with the battery attached. Alternatively, a message may be displayed on the display 46 requesting the user to allow the LMR to continue with the update. If the user does not reply or if the user indicates that no update should be performed, the update may be performed as part of the shut down process when powering down the LMR or at a later time with the user is again asked whether the update should be performed.

If a determination is made at 236 that the update data is not newer than the data in the LMR, then data is transferred from the device to the memory of the battery at 244. For example, if the firmware version in the LMR is newer than the firmware version in the battery, such as if the LMR has already received the update from another battery and the presently connected is an older battery or was not uploaded with the update, then the firmware stored in LMR is transferred to the memory of the battery. For example, the update data stored in the battery may be overwritten by the data in the LMR.

It should be noted that the number of transfers of data from the memory of the battery to LMRs as the battery is connected to different LMRs (as part of pooled batteries) may be maintained in the memory of the battery. Accordingly, the number of LMRs that have been updated may be tracked.

Thus, various embodiments of the invention allow data to be disseminated to a plurality of electronic devices through one or more batteries that can be removably connected to the plurality of electronic devices. For example, in an application where users share batteries, when a battery is depleted, the battery is returned to a charger or charging station to be recharged and thereafter used by another user in another device, for example, another LMR by connecting the battery to the LMR. Accordingly, only a few batteries (or one battery) with the latest data (e.g., firmware) needs to be added to the battery pool to ensure that all devices receive the latest data or update.

The various embodiments and/or components, for example, a battery or a battery charger, or components or controllers therein, may be implemented as part of one or more computers or processors, which may be separate from or integrated with the battery charger or charge monitor. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

As used herein, the term "computer" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. For example, the ordering of steps recited in a method need not be performed in a particular order unless explicitly stated or implicitly required (e.g., one step requires the results or a product of a previous step to be available). While the dimensions and types of materials described herein are intended to define the parameters of the invention, they are by no means limiting and are exemplary embodiments. Many other embodiments will be apparent to those of skill in the art upon reviewing and understanding the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of providing update data to a portable electronic device, the method comprising:
   removably connecting a battery pack comprising a memory and a battery cell to a portable electronic device deployed to a consumer, said battery pack providing an internal power source to said portable electronic device;
   supplying power from said internal power source exclusively to said portable electronic device;
   accessing update data stored in said memory that is operative to facilitate control of said portable electronic device;
   transferring the update data from said memory to the portable electronic device; and
   updating the portable electronic device with the update data which was transferred thereto.

2. A method in accordance with claim 1, wherein the update data comprises a firmware update for the portable electronic device.

3. A method in accordance with claim 1, wherein the battery cell comprises a rechargeable battery and the portable electronic device comprises a land mobile radio.

4. A method in accordance with claim 1, further comprising providing notification on a display of the portable electronic device after the updating is complete.

5. A method in accordance with claim 1, further comprising comparing the update data to data in the portable electronic device to determine which is newer.

6. A method in accordance with claim 5, wherein the transferring is only performed if the update data is newer than the data within the portable electronic device.

7. A method in accordance with claim 5, wherein if the update data is not newer than the data in the portable electronic device, the update data is not transferred to the portable electronic device.

8. A method in accordance with claim 7, further comprising transferring the data from the portable electronic device to the memory in the battery pack.

9. A method in accordance with claim 8, wherein the transferring comprises overwriting the update data in the memory in the battery pack.

10. A method in accordance with claim 1, further comprising storing a number of times the update data is transferred.

11. A method in accordance with claim 1, wherein the transferring is performed through at least one contact of each of the battery and portable electronic device.

12. A method for updating firmware in a portable communication device that is deployed to a consumer, the method comprising:
    adding to a pool of rechargeable batteries a battery pack which includes a rechargeable battery and a memory device in which is stored an upgraded firmware that is operative to facilitate control of said portable communication device;
    configuring the battery pack to provide an internal power source to said portable communication device; and
    configuring the memory device to transfer the upgraded firmware to said portable communication device upon connection of the battery pack to the portable communication device.

13. A method in accordance with claim 12, wherein the portable communication device is a land mobile radio.

14. A method in accordance with claim 12, wherein the upgraded firmware is transferred if a version thereof is newer than a version of a firmware of the portable communication device.

15. A method in accordance with claim 12, wherein each of the batteries in the pool of rechargeable batteries comprises a memory and further comprising configuring each of the batteries to receive from a portable communication device the updated firmware transferred from the added battery pack.

16. A rechargeable battery pack, comprising:
    a rechargeable battery configured to provide an internal power source to a portable electronic device which is deployed to a consumer;
    a memory storing update data that is operative to facilitate control of the portable electronic device; and
    a data contact configured to engage the portable electronic device and allow access by the portable electronic device to the update data stored in the memory.

17. A rechargeable battery pack in accordance with claim 16, wherein the update data comprises a firmware update for the portable electronic device.

18. A rechargeable battery pack in accordance with claim 16, wherein the memory is at least one gigabyte in size.

19. A rechargeable battery pack in accordance with claim 16, wherein the data contact is configured to allow transfer of data from the portable electronic device to the memory.

20. A rechargeable battery pack in accordance with claim 16, further comprising a housing and wherein the memory comprises an integral memory within the housing.

* * * * *